Figure 1:
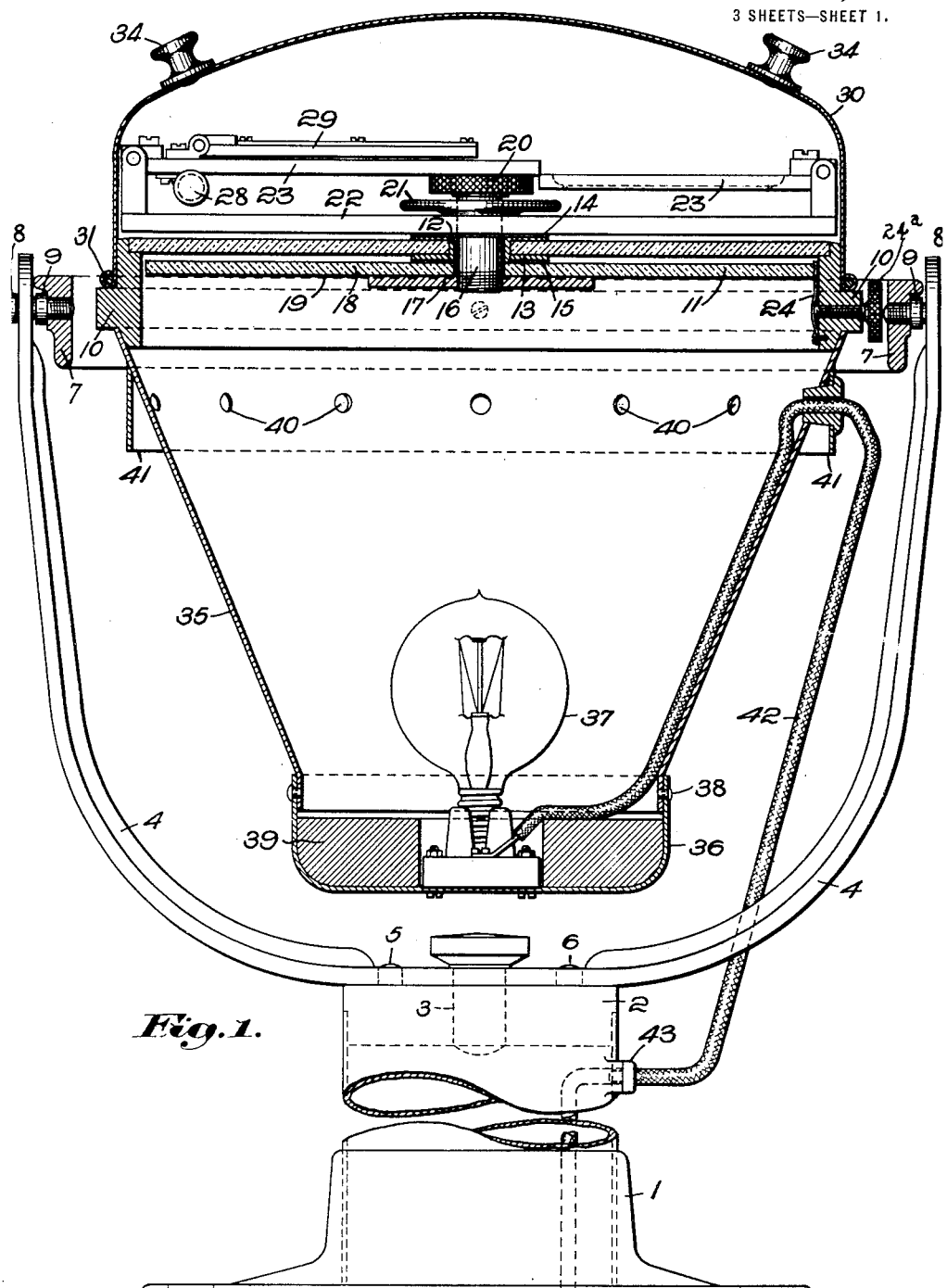

W. O. WHITE.
PELORUS.
APPLICATION FILED OCT. 17, 1918.

1,399,330.

Patented Dec. 6, 1921.
3 SHEETS—SHEET 1.

Inventor:
Wilfred O. White,
by [signature] Attys

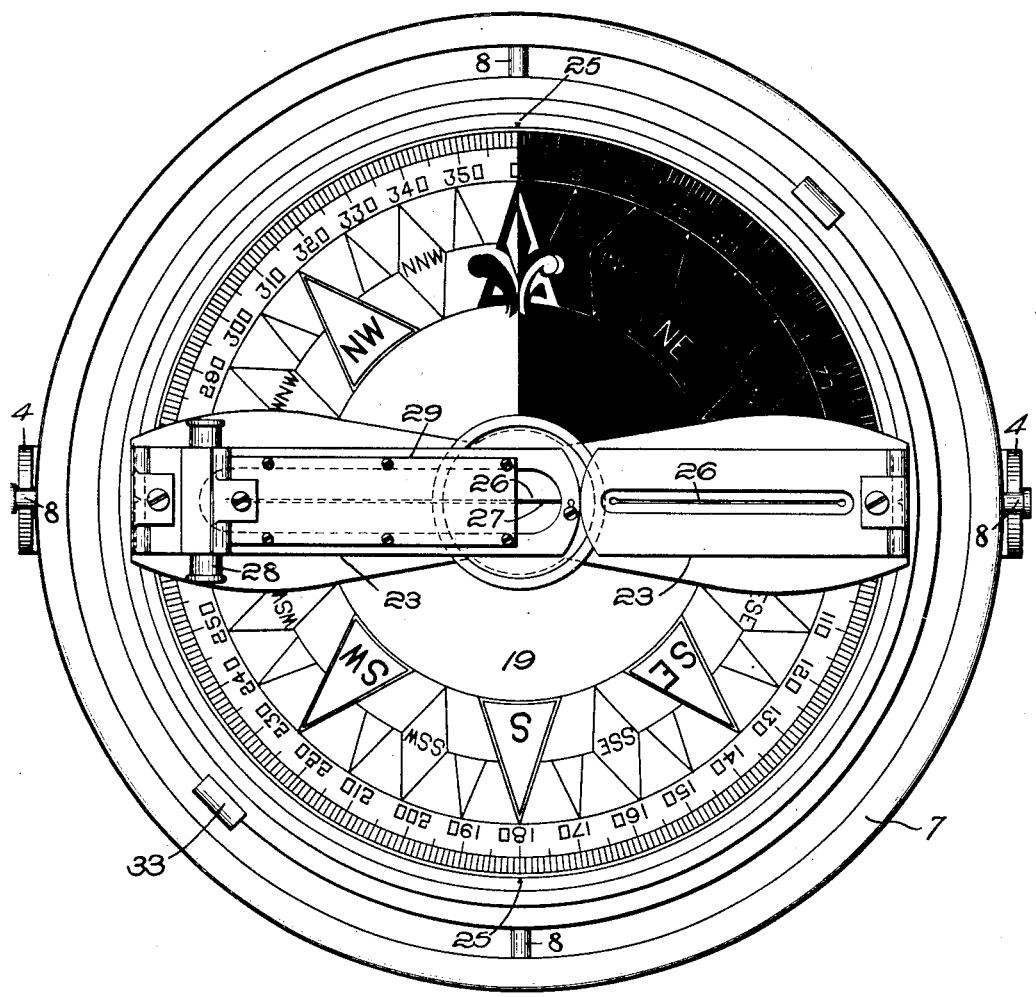

W. O. WHITE.
PELORUS.
APPLICATION FILED OCT. 17, 1918.
1,399,330.
Patented Dec. 6, 1921.
3 SHEETS—SHEET 3.
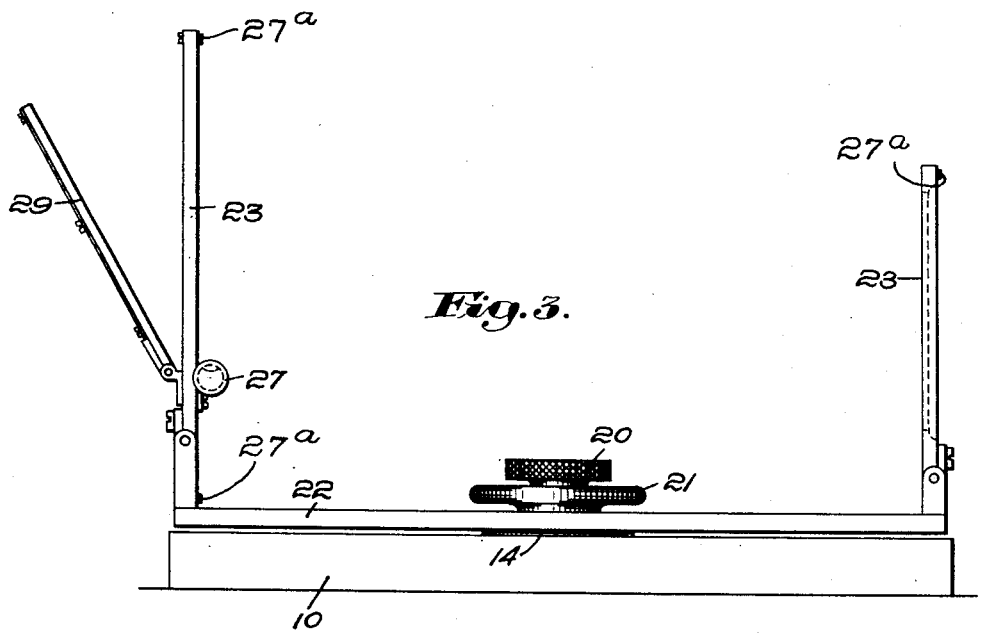
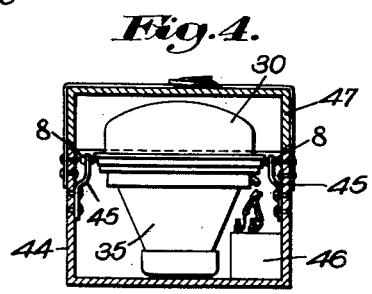
Inventor:
Wilfred O. White,

UNITED STATES PATENT OFFICE.

WILFRID O. WHITE, OF WEST NEWTON, MASSACHUSETTS.

PELORUS.

1,399,330.  Specification of Letters Patent.  Patented Dec. 6, 1921.

Application filed October 17, 1918. Serial No. 258,570.

*To all whom it may concern:*

Be it known that I, WILFRID O. WHITE, a citizen of the United States, and a resident of West Newton, county of Middlesex, and State of Massachusetts, have invented an Improvement in Pelorus, of which the following description, in connection with the accompanying drawings, is a specification, like characters on the drawings representing like parts.

This invention relates to instruments for navigation and aims to provide a pelorus of improved construction.

In the drawings of the embodiment of my invention illustrated and described herein:

Figure 1 is a side elevation, partly in section;

Fig. 2, a plan, a portion of the face of the dial being shown as opaque with white characters;

Fig. 3, a side elevation of the alidade and sight vanes; and

Fig. 4, a vertical section of a combined carrying case and modified support for the pelorus.

Referring first to Fig. 1, my novel pelorus comprises a suitable standard or post 1, adapted to be properly secured to the bridge or other support not shown. At its upper end the post is provided with a head 2, tapped to receive a screw 3, or other suitable locking device for securing thereto the gimbal ring frame or yoke 4. For convenience in mounting the yoke on the standard 1, fore and aft, locating pins 5—6 are provided.

The outer gimbal ring 7, Fig. 1, is movably mounted in the upper ends of the yoke arms 4 by screws 8 having lock nuts 9. Within the outer ring 7 and pivoted thereto in like manner for free swinging movement at right angles thereto is the frame or inner ring 10 which carries a glass cover 11 at its upper edge as a protection for the dial or compass card, to be referred to later.

At its center the cover 11 is drilled to receive a sleeve 12, flanged at its upper end and threaded on its lower end to take a nut 13, by means of which it is securely fastened in position on the cover. A washer 14 of suitable material may be provided at the upper end of the sleeve 12, for supporting the alidade to be described, and a preferably spring washer 15 may be positioned beneath the nut 13. In this sleeve, Fig. 1, is mounted a short stud 16, with a nut 17 on its lower end, acting to support thereon the glass disk 18. Beneath the disk 18 and on the nut 17, I place the usual dial or compass card 19, preferably having the lines in white on a black ground as shown in Fig. 2, so that the dial looks the same at night as by day.

Thus the eye always rests on a background of the same color and is not tired and confused by a changing background such as white, which looks differently by day and when illuminated at night.

On its upper end this stud is provided with a thumb nut 20 by means of which it and the dial 19 may be independently rotated as desired. A clamping nut 21 is also provided for locking to the stud 16 and card 19, the alidade 22 carrying the sight vanes 23, by means of which they may be moved together when desired. By this means the deviations of the compass may be much more readily ascertained, as will be pointed out presently. The dial 19 may be held in adjusted position relative to the ring 10 by means of a spring 24 secured to the inner edge of the ring 10 and bearing against the edge of the dial, a thumb screw 24ᵃ in the ring controlling the action of the spring. The usual lubber's line indicated by two points 25, Fig. 2, is provided in the ring 10.

Each sight vane 23, Fig. 2, is provided with a slot 26, that in the left-hand vane, Fig. 2, being much the wider, and having also the usual hair line 27.

For more conveniently and accurately obtaining the azimuth of a heavenly body, Fig. 2, by disposing the spirit level 28 so that the bubble may be seen while sighting through the vanes 23, I have conceived the novel construction herein described of positioning the spirit level 28 on and near the lower end of the sight vane carrying the hair line. On the outer face of this vane I position the dark glass mirror 29. By this means the reflected light on the bubble is directly before the eyes and can be seen at the same time as the heavenly body and without moving the eyes.

A suitable cover or hood 30 is provided with a wire 31 at its inturned lower edge, slots, not shown, being provided at intervals in the edge, to receive inturned fingers 33, Fig. 2 on the ring 10 for locking the hood in position. Suitable knobs 34 may be also provided for the hood.

For illuminating the pelorus to facilitate its use at night, I provide a cone-shaped lamp casing 35 which is suitably secured to the ring 10. At its apex the casing is provided with a lamp base 36 and lamp 37, which may be secured to the casing by any convenient form of locking means, as a bayonet joint 38. The base also carries a substantial weight 39 to assist in retaining the instrument in a level position.

Ventilating openings 40 are provided in the casing 35 and a depending hood 41 to conceal these openings is also supplied.

By mounting the illuminating agent as described, I obtain several advantages.

First, the lamp being positioned directly beneath the center of the dial gives a substantially evenly distributed illumination over the whole dial surface from its center outward, which is not the case when the lamp is at one side of the center of the dial, or when a frog is used to support the center of the instrument.

Furthermore, the lamp being mounted directly beneath the center of the dial, the brightest spot is uniformly in the center and it does not move about as is the case when the lamp is secured to the side of the binnacle or its support and partakes of the rolling motion of the vessel.

This uneven illumination is extremely annoying at times and under some conditions, and makes accurate reading of the compass difficult.

Again by mounting the lamp to swing with with the instrument it gives abundance of room for the lamp 37 and weight 39 to swing with the pitch and roll of the vessel, within the limits of the yoke 4 without hitting the yoke, and without the necessity for making it so large as to be unsightly and inconvenient. Of course the cable 42 from the lamp may be carried to any convenient form of connection 43 at any suitable point on either the yoke or standard or elsewhere, herein the standard.

While the standard 1 is adapted for use with the pelorus on board ship, nevertheless, in order that the pelorus may be used also in life or other boats or on shore in emergencies, I provide a case 44, Fig. 4, having brackets 45 to receive the pins 9 on which the pelorus may be mounted and used. The case 44 may be provided, if desired, with a battery 46 to which connection may be made for current when the pelorus is to be used in its case.

In using my improved pelorus to ascertain the "true" course of the ship, the "true" bearing of the sun is first computed in the usual manner. The dial is then held stationary by the thumb nut 20 while the sight vanes are rotated until they correspond with this "true" bearing on the dial and the thumb nut 20 is then released. The dial and sight vanes are then locked by the lock nut 21 and both are then simultaneously directed by means of the nut 21 toward the sun, the bubble in the spirit level being in plain view as one sights through the vanes, without the necessity of moving the eyes to see it. When the sun is bisected by the hair line of sight vane, the reading at the "ship's head" is the "true" course of the ship.

To obtain the "magnetic" course of the ship the same procedure is followed except that the variation is applied to the sun's "true" bearing on the dial, which is then directed toward the sun as before. The reading at the "ship's head" in this case gives the "magnetic" course of the ship and the difference between this course and the course by compass is the "deviation" without further computation.

With the ordinary pelorus it is necessary, when positioning the sight vanes and dial, to first direct the vanes toward the sun and then bring the dial into adjustment with them, while in the meantime the ship's course has probably changed somewhat. In such case the vanes and dial must again be adjusted before they can be clamped to the dial, thus causing inconvenience, delay and possible incorrectness in reading.

By the use of my pelorus this inconvenience, delay and possible incorrectness are obviated, as the sight vanes and dial are directed simultaneously toward the sun and comparisons made instantly. The illuminated dial lighted uniformly at all times makes it possible to take bearings at night with an accuracy and convenience which is not possible with the use of the pelorus as now constructed.

In this manner the pelorus may be used in a life boat or on shore, the top 47 of the case being readily removable.

While I have illustrated herein one embodiment of my invention it is obvious that many detail changes may be made therein without departing from the spirit of my invention and within the scope of the appended claims.

Claims—

1. A pelorus of the class described comprising a frame, a universally mounted inner ring thereon having a cover, a compass dial with illuminated characters beneath the cover and means carrying the dial and extended above the cover for independently rotating the dial.

2. An instrument of the class described comprising a frame, a universally mounted inner ring thereon having a cover, a compass dial with illuminated characters beneath the cover, sight vanes above the cover and means carrying the dial and extended also above the cover for rotating the vanes and dial jointly.

3. An instrument of the class described comprising a frame, a universally mounted inner ring thereon having a cover, a compass dial with illuminated characters beneath it, and sight vanes above the cover mounted for rotation relative to the dial and jointly therewith.

4. An instrument of the class described comprising a frame, a universally mounted ring thereon having a cover, a compass dial with illuminated characters beneath it, sight vanes above the cover, and a spirit level on one of the sight vanes.

5. An instrument of the class described comprising a frame, a universally mounted ring thereon having an opaque compass dial, with light colored contrasting characters thereon, and sight vanes; and an illuminating agent suspended from the ring.

6. An instrument of the class described comprising a frame, a universally mounted ring thereon having a light transmitting cover, sight vanes above the cover and a compass dial with illuminated characters and lighting agent below the cover, and a casing with ventilating openings for the light, and a light excluding hood for the openings also below the cover.

7. An instrument of the class described comprising a frame, a universally mounted ring thereon having a light transmitting cover, sight vanes above the cover, a compass dial having illuminated characters exposed to light rays and a light support suspended from the ring with a weight and lighting agent therein.

8. An instrument of the class described comprising a frame, a universally mounted ring thereon having a cover, a compass dial beneath the ring and means above the cover for rotating it, a light support suspended from the ring, a lighting agent therein, a source of light therefor and an inclosing cabinet for the instrument with a base therefor.

9. A pelorus comprising a casing having a dial, and sight vanes with a spirit level thereon in the line of sight therethrough.

10. A pelorus comprising a ring, a cover and dial therefor, a lamp centrally mounted thereunder and movable simultaneously therewith, an alidade on the cover with sight vanes, a level on one of the vanes, and means on the cover for rotating singly and jointly the dial and alidade.

11. A pelorus comprising the yoke 4, the universally mounted ring 10 therein, light support 35 and light 37 suspended from said ring, the cover 11 also on the ring, with the stud 16, thumb nut 20 and clamping nut 21 on said stud carried by the cover, a transparent disk 18, a compass dial 19 below the cover and carried by said stud and rotatable by part of the stud above the cover, the alidade 22 with the sight vanes 23 thereon on said stud and lockable by the clamping nut 21 thereto and to the compass dial, whereby they may be rotated jointly, and the level 28 on the sight vane 23 and in the line of sight therethrough whereby position of the bubble therein may be observed while sighting through the vanes.

In testimony whereof, I have signed my name to this specification.

WILFRID O. WHITE.